(12) United States Patent
Marinakos et al.

(10) Patent No.: US 12,546,746 B2
(45) Date of Patent: Feb. 10, 2026

(54) SYSTEMS AND DEVICES FOR ESTIMATING SUBSTANCE CONCENTRATION

(71) Applicant: Ekidna Sensing Inc., Ottawa (CA)

(72) Inventors: Apostolos Marinakos, Ottawa (CA); Nicholas Boileau, Ottawa (CA); Steven Price-Williams, St-Lazare (CA); Jacob Watkins, Ottawa (CA); Nicole Rice, Ottawa (CA); Ben Cohen-Kleinstein, Vaughan (CA); Oliver Aramini, Fergus (CA); Artem Sotnikov, Toronto (CA); Samuel Roberge-Arnott, Navan (CA); Labros Spandonidis, Markham (CA)

(73) Assignee: Ekidna Sensing Inc., Ottawa (CA)

( * ) Notice: Subject to any disclaimer, the term of this patent is extended or adjusted under 35 U.S.C. 154(b) by 166 days.

(21) Appl. No.: 18/289,469

(22) PCT Filed: May 5, 2022

(86) PCT No.: PCT/CA2022/050707
§ 371 (c)(1),
(2) Date: Nov. 3, 2023

(87) PCT Pub. No.: WO2022/232939
PCT Pub. Date: Nov. 10, 2022

(65) Prior Publication Data
US 2024/0241081 A1    Jul. 18, 2024

Related U.S. Application Data

(60) Provisional application No. 63/184,637, filed on May 5, 2021.

(51) Int. Cl.
*G01N 27/48* (2006.01)
*B01L 3/00* (2006.01)

(52) U.S. Cl.
CPC ............ *G01N 27/48* (2013.01); *B01L 3/5082* (2013.01); *B01L 2300/042* (2013.01); *B01L 2300/0645* (2013.01); *B01L 2300/0663* (2013.01)

(58) Field of Classification Search
CPC ......... B01L 2200/0668; B01L 2200/16; B01L 2300/042; B01L 2300/046;
(Continued)

(56) References Cited

U.S. PATENT DOCUMENTS

2017/0326546 A1* 11/2017 Peumans .............. A61K 9/0014
2020/0400695 A1  12/2020 Dweik et al.
2021/0247409 A1*  8/2021 Nawana ............. G01N 33/5438

* cited by examiner

*Primary Examiner* — Gurpreet Kaur
(74) *Attorney, Agent, or Firm* — Brion Raffoul

(57) ABSTRACT

Systems and methods for determining a concentration of a substance in a sample. In one embodiment, the system uses a device that cooperates with a container containing a sample mixed with a solution. The mixture comes into contact with a sensor that has been activated by the device, thereby allowing data signals to be received by the device through electrodes that are coupled to the sensor. The data signals are then analyzed and, based on the characteristics of the signal, a concentration of the substance can be estimated. After a single use, the container is sealed and can be disposed of properly to avoid further contact with the solution or the sample. In some embodiments, a solid sample is first processed in a second container before being mixed with the solution.

16 Claims, 15 Drawing Sheets

(58) Field of Classification Search
CPC ....... B01L 2300/047; B01L 2300/0645; B01L 2300/0663; B01L 2300/0832; B01L 2400/0457; B01L 3/5082; G01N 27/48; G01N 33/0098

See application file for complete search history.

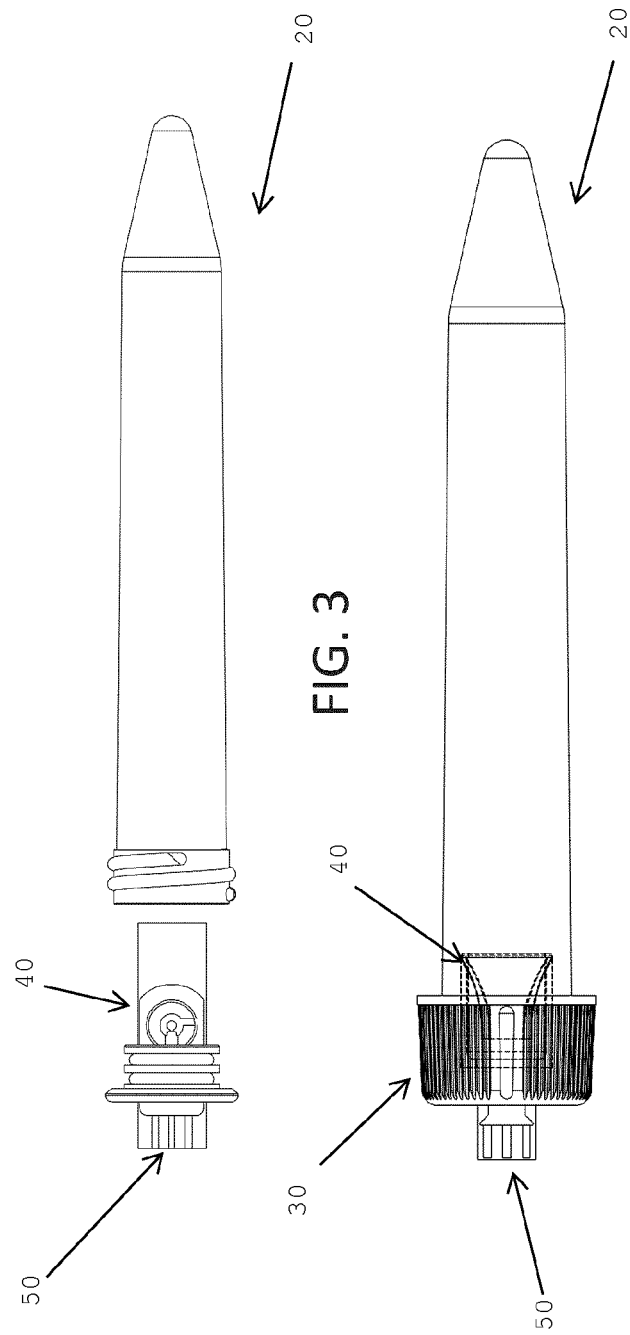

SYSTEMS AND DEVICES FOR ESTIMATING SUBSTANCE CONCENTRATION

RELATED APPLICATIONS

The application is a 35 U.S.C. 371 national stage filing and claims priority to International Application No. PCT/CA2022/050707 filed on May 5, 2022, entitled SYSTEMS AND DEVICES FOR ESTIMATING SUBSTANCE CONCENTRATION which claims the benefit of U.S. Provisional Application No. 63/184,637 filed on May 5, 2021, each of which are incorporated herein by reference in their entirety.

TECHNICAL FIELD

The present invention provides systems and methods relating to automated chemical analysis. More specifically, the present invention relates to systems, devices, and methods relating to a device suitable for detecting and assessing cannabinoids and cannabis materials.

BACKGROUND

The legalization and increasing acceptance of cannabis in many jurisdictions has fueled the interest in cannabis and cannabinoid-based substances, as well as in products and items derived from cannabis. This interest has also led to the need for a quick, accurate, and precise method to determine whether cannabis is present in a substance, as well as the quantification of the cannabinoids in a sample.

Currently, to determine if and, particularly, how much cannabis is present in a sample, the sample must be sent to a laboratory. As well, if cannabinoids are known to be in a sample, to determine the type of cannabinoid present as well as to quantify the amount in the sample, the sample also has to be sent to a laboratory. This laboratory-based method is expensive, slow, complex, and can be inaccurate. Current methods for identification and quantification are slow, centralized, and require highly qualified personnel. In addition, laboratories for this paradigm require large capital costs for setup and high maintenance costs. Currently, cannabinoid quantification is quite difficult and requires such laboratories.

Current cannabinoid detection and quantification methods can be divided into three main categories: HPLC/laboratory analysis, optical solutions, and image/AI solutions.

Laboratory analysis methods have the above noted issues. Other solutions that are portable and that do not require a full-blown laboratory suffer from inaccuracy and still have many of the inconveniences/complexities associated with HPLCs. Optical solutions such as FT-IR or NIR systems are not precise or accurate enough for quantification and are often limited in sample type. Such optical systems might have a use for qualification/identification but are unsuitable for quantification. In addition, such optical systems are also quite expensive in terms of capital cost. Finally, while image/AI based systems are cheap, they are extremely inaccurate and unsuitable for quantitative applications in the cannabis industry. Such systems are consumer focused and are thus unsuitable for commercial applications.

It should be noted that the industry standard for cannabinoid identification/quantification, high performance liquid chromatography (HPLC), is often prohibitively expensive to own, operate, and may require a skilled technologist or analytical chemist to properly use. As well, it has a very low processing rate and acts as a bottleneck in quality assurance methods. HPLC apparatuses also typically require dedicated technical experience to use and operate correctly, further adding to the operating cost.

Optical based devices, although significantly cheaper than HPLC and easier to operate, are not very accurate, with up to 20% absolute error. These devices are therefore limited in industrial usefulness. Such devices are not suitable for uses where the quality or concentration of cannabinoids needs to be determined with a high degree of confidence.

There is therefore a need for systems, devices, and methods that provide preferably portable devices that can be easily and rapidly used to detect and accurately quantify cannabinoid concentrations in samples. Such devices are, preferably, cheap, simple to use, and provide suitably accurate results.

SUMMARY

The present invention relates to systems and methods for determining a concentration of at least one substance in a sample. In one embodiment, the system uses a device that cooperates with a container containing a sample mixed with a solution. The mixture comes into contact with a sensor that has been activated by the device, thereby allowing data signals to be received by the device through electrodes that are coupled to the sensor. The data signals are then analyzed and, based on the characteristics of the signal, concentrations of unique substances can be estimated. After a single use, the container is sealed and can be disposed of properly to avoid further contact with the solution or the sample. In some embodiments, a solid sample is first processed in a second container before being mixed with the solution.

In one aspect, this document discloses a system for gathering data for estimating a concentration of at least one substance in a sample, the system comprising: a container for said at least one substance and for a solution, said at least one substance and said solution having different electrical properties when mixed with one another; a contact-based sensor for sensing said electrical properties of a mixture of said at least one substance and said solution, said sensor being within said container and in contact with said mixture; a plurality of electrodes coupled to said sensor for applying a voltage to said sensor and for receiving a current signal through said sensor; and an electronics module for controlling said voltage and for measuring characteristics of said current signal, wherein said electronics module interfaces with a data processing device to thereby allow said data processing device to analyze said characteristics of said signal and to thereby estimate said concentration of said at least one substance based on said characteristics of said signal, and said electronics module is coupled to said plurality of electrodes to allow for control of said voltage and to allow for reception and measurement of said signal.

In another embodiment, this document discloses a system wherein said at least one substance is a cannabis-derived substance.

In another embodiment, this document discloses a system wherein said substance is at least one of: CBD, CBDa, THC, THCa, CBG, CBGa, CBN, CBNa, CBC, CBCa, THCV, CBDV, another cannabinoid, and a non-cannabinoid substance.

In another embodiment, this document discloses a system wherein said solution comprises a solvent and an electrolyte.

In another embodiment, this document discloses a system wherein said solution includes at least one of: TBAP, DMSO, CoPc, Fc, and FBBB.

In another embodiment, this document discloses a system wherein electrochemical methods are used to estimate said concentration.

In another embodiment, this document discloses a system wherein said voltage signal is repeatedly applied at different voltages to result in different current signals sensed through said sensor.

In another embodiment, this document discloses a system wherein a range of voltages is applied and, for each voltage applied, a current is sensed through said sensor.

In another embodiment, this document discloses a system wherein said solution is provided inside said container.

In another embodiment, this document discloses a system further comprising a cap to seal said container once said solution and said at least one substance are in a mixture.

In another embodiment, this document discloses a system wherein said sensor and said electrodes are incorporated into said cap.

In another embodiment, this document discloses a system wherein, when said cap is deployed on said container, said sensor protrudes into an interior of said container such that when said at least one substance and said solution are mixed in said container, a resulting mixture is in contact with said sensor.

In another embodiment, this document discloses a system wherein said cap comprises a grinder for grinding a solid sample to thereby produce a ground sample prior to mixing said ground sample with said solution.

In another embodiment, this document discloses a system wherein said system incorporates a processing element for processing a solid sample to thereby produce a processed sample prior to mixing said processed sample with said solution, wherein said processed sample has a larger surface area than said solid sample.

In another embodiment, this document discloses a system wherein said processing element comprises a plurality of beads.

In another embodiment, this document discloses a system wherein said processing element is contained in a second container and said solid sample is added to said second container for processing.

In another embodiment, this document discloses a system wherein said second container further comprises an extraction fluid, such that said processed sample and said extraction fluid form a second mixture, said system further comprising a fluid transfer device for transferring a portion of said second mixture to said container after said processing.

In another embodiment, this document discloses a system wherein said system further comprises a scale for measuring a mass of said sample prior to mixing said sample with said solution in said container.

In one aspect, this document discloses a kit for determining a concentration of at least one substance, the kit comprising: a container for said at least one substance and for a solution, said at least one substance and said solution having different electrical properties when mixed with one another; a contact-based sensor for sensing said electrical properties of a mixture of said at least one substance and said solution, said sensor being within said container and in contact with said mixture; a plurality of electrodes coupled to said sensor for applying a voltage to said sensor and for receiving a current signal through said sensor; and an electronics module for controlling said voltage and for measuring characteristics of said current signal, wherein said electronics module interfaces with a data processing device to thereby allow said data processing device to analyze said characteristics of said signal and to thereby estimate said concentration of said at least one substance based on said characteristics of said signal, and said electronics module is coupled to said plurality of electrodes to allow for control of said voltage and to allow for reception and measurement of said signal.

In another embodiment, this document discloses a kit wherein said solution is part of said kit.

In another embodiment, this document discloses a kit further comprising a cap to seal said container once said solution and said at least one substance are in a mixture.

In another embodiment, this document discloses a kit wherein said sensor and said electrodes are incorporated into said cap.

In another embodiment, this document discloses a kit wherein, when said cap is deployed on said container, said sensor protrudes into an interior of said container such that when said at least one substance and said solution are mixed in said container, a resulting mixture is in contact with said sensor.

In another embodiment, this document discloses a kit wherein said cap comprises a grinder for grinding a solid sample to thereby produce a ground sample prior to mixing said ground sample with said solution.

In another embodiment, this document discloses a kit further comprising at least one processing element for processing a solid sample to thereby produce a processed sample prior to mixing said processed sample with said solution in said container, wherein said processed sample has a larger surface area than said solid sample.

In another embodiment, this document discloses a kit wherein said processing element comprises a plurality of beads.

In another embodiment, this document discloses a kit wherein said processing element is contained in a second container and said solid sample is added to said second container for processing.

In another embodiment, this document discloses a kit wherein said second container further comprises an extraction fluid, such that said processed sample and said extraction fluid form a second mixture, said kit further comprising a fluid transfer device for transferring a portion of said second mixture to said container after said processing.

In another embodiment, this document discloses a kit further comprising a scale for measuring a mass of said sample prior to mixing said sample with said solution in said container.

In another embodiment, this document discloses a kit wherein said substance is a cannabis-derived substance.

In another embodiment, this document discloses a kit wherein said substance is at least one of: CBD, CBDa, THC, THCa, CBG, CBGa, CBN, CBNa, CBC, CBCa, THCV, CBDV, another cannabinoid, and a non-cannabinoid substance.

In another embodiment, this document discloses a kit wherein said solution comprises a solvent and an electrolyte.

In another embodiment, this document discloses a kit wherein said solution comprises at least two of: TBAP, DMSO, CoPc, Fc, and FBBB.

In another embodiment, this document discloses a kit wherein at least one of cyclic voltammetry, linear sweep voltammetry, and square wave voltammetry is used to estimate said concentration.

In some embodiments, the substance is a cannabis-derived substance, such as a cannabinoid. The substance, in some implementations, comprises at least one of: CBD, CBDa, THC, THCa, CBG, CBGa, CBN, CBNa, CBC, CBCa, THCV, CBDV, and another cannabinoid. The solution comprises at least two of TBAP, DMSO, CoPc, Fc (ferrocene), FBBB, and another phthalocyanine.

In some embodiments, electrochemical methods such as linear voltammetry, square wave voltammetry and/or cyclic voltammetry is used to estimate the concentration of the substance and the voltage signal may be repeatedly applied at different voltages to result in different current signals sensed through the sensor. In one aspect, a range of voltages may be applied and, for each voltage applied, a current is sensed through the sensor. For some aspects the shape of the resulting current versus voltage plot may be used to determine characteristics of the substance.

In some embodiments, the solution is provided inside the container and there is a cap to seal the container once said solution and the substance are in a mixture. The sensor and the electrodes may be incorporated into the cap or into the container itself. When the cap is deployed on the container, the sensor protrudes into an interior of the container such that when the substance and the solution are mixed in the container, a resulting mixture may be in contact with the sensor.

In some embodiments, the present invention provides a cap which comprises a grinder for grinding a solid sample prior to mixing the solid sample with the solution. Further, in some embodiments, the system incorporates a processing element (e.g., in a separate container) for mechanical processing of the solid sample to thereby increase its surface area. Such processing may include any process which increases the solid sample's surface area, including without limitation: grinding, pulverizing, slicing, crushing, milling, etc. The processing of the solid sample, in some embodiments, occurs prior to mixing the resulting processed sample with the solution in the container, while, in some embodiments, the processing occurs simultaneously with mixing. In one embodiment, the processing element comprises a plurality of beads in a separate container, to which the solid sample is added. The container is then agitated and the resulting agitation of the beads and the solid sample results in processing of the solid sample, such that the resulting processed sample has a larger surface area than the solid sample. In some embodiments, the device incorporates a scale for measuring a mass of the sample prior to mixing the sample with the solution in the container. Yet a further variant may include a filter or membrane for limiting particle travel to the sensor. Another variant may include a fluid transfer device, such as a syringe, for transferring material from one container into another.

BRIEF DESCRIPTION OF THE DRAWINGS

The embodiments of the present invention will now be described by reference to the following figures, in which identical reference numerals in different figures indicate identical elements and in which:

FIG. 3 illustrates a container in exploded view according to the present invention as illustrated in FIG. 1;

FIG. 4 shows the container of FIG. 3 with an assembled cap deployed on the container;

DETAILED DESCRIPTION

Figure 1:
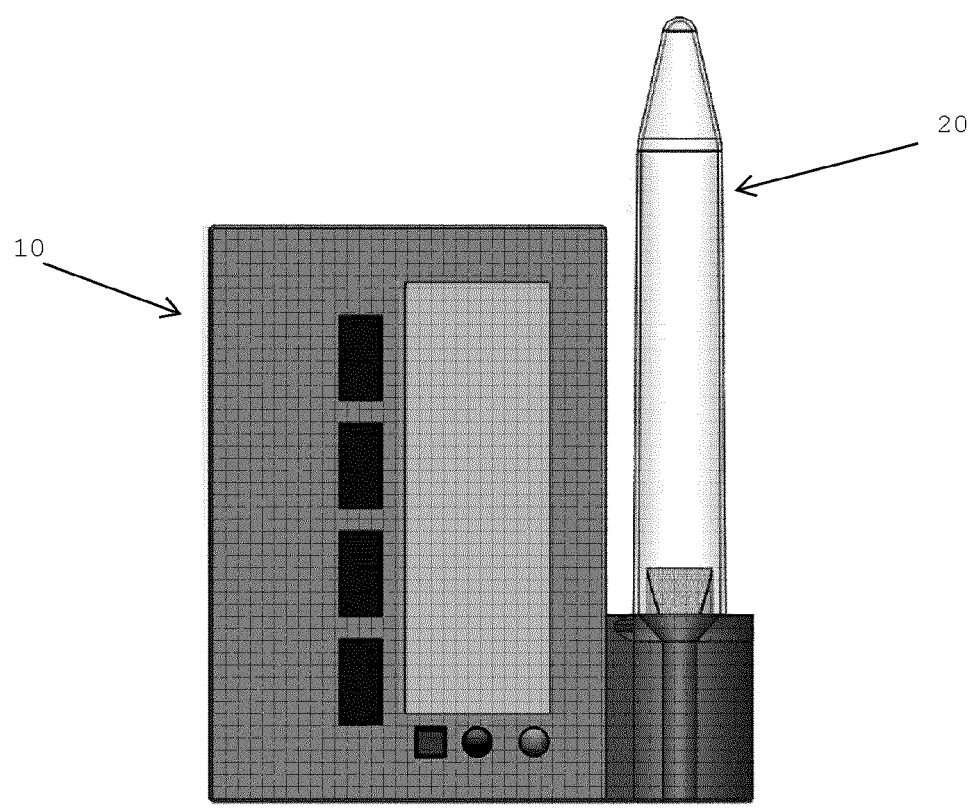
FIG. 1 is an illustration of one embodiment of the present invention.
Figure 2A:
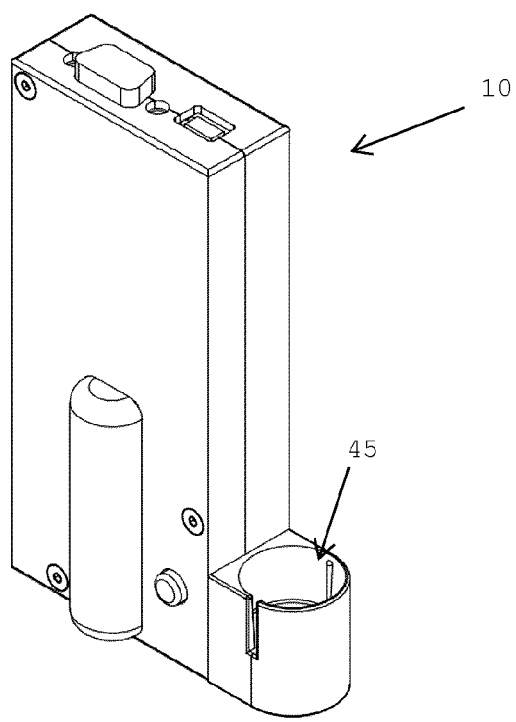
FIG. 2A is an image of a device according to the present invention as illustrated in FIG. 1.
Figure 2B:
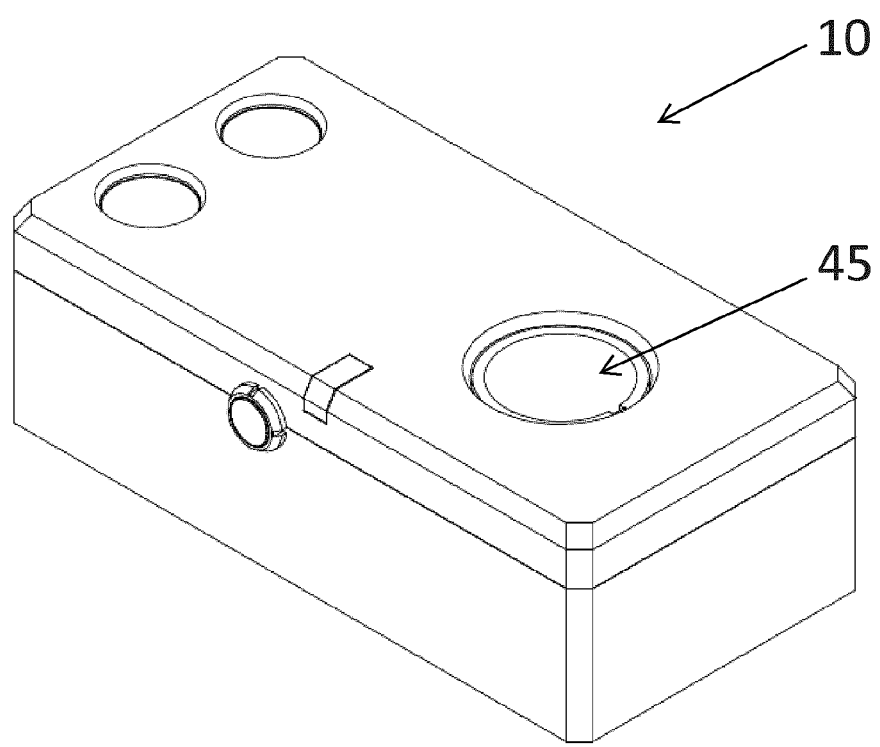
FIG. 2B is an image of another embodiment of a device according to the present invention.
Figure 2C:
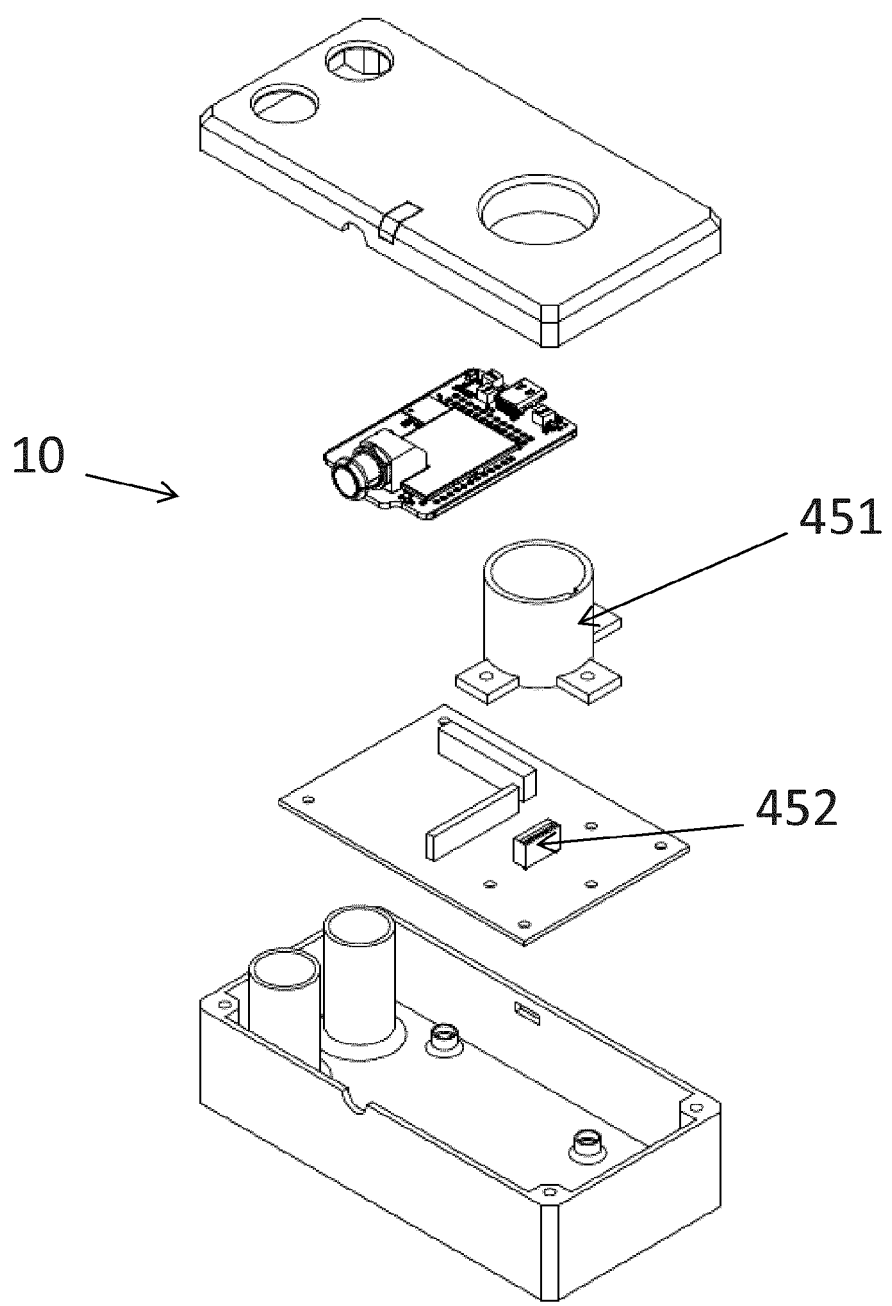
FIG. 2C is an exploded view of the device in FIG. 2B.

Referring to FIG. 1, illustrated is one implementation of an embodiment of the present invention. As can be seen, the implementation includes a device 10 and a container 20. FIG. 2A illustrates one implementation of device 10 by itself, while FIG. 2B illustrates another implementation of the device 10 and FIG. 2C is an exploded view of the implementation in FIG. 2B. FIG. 3 illustrates the container 20 in exploded view. FIG. 4 shows the container 20 with a cap deployed to seal the container. In some embodiments, the sample to be tested is deposited inside the container 20 that contains a solution. (Note that, in some embodiments, discussed more below, a second container is used for processing a solid sample before mixing.)

As shown in FIG. 4, in one embodiment, the container is then sealed with the cap 30 that includes a sensor 40 and the sample is mixed with the solution. In one embodiment, the container is agitated, shaken, or vortexed, causing the sample to be suspended or dissolved in the solution. However, such shaking may risk damage to the sensor 40. As such, other means of agitating the container may be used. As well, in other embodiments, the container 20 is sealed with a second cap (not shown in FIG. 1) during the mixing process. This second cap contains no sensors/electronics and may be suitable for, e.g., high-intensity agitation. In such embodiments, when the mixing is complete, the second cap is removed from the container 20 and resealed using the cap 30 that comprises the sensor 40. The container 20 is then up-ended and inserted into the device through a port 45 that mates with the cap 30 to hold the container 20.

The upending of the container causes the mixed solution and the cannabinoids in the solution to come into contact (preferably to immerse) with the sensor 40—if the sample was a solid, a shroud 60 that may be present would prevent the actual sample from contacting the sensor. The cannabinoids affect the electrical properties of the mixed solution and, through electrodes 50 in the cap that are in electrical contact with the sensor 40, the device 10 sends electrical signals to the sensor 40 to thereby activate the sensor 40. Again through these electrodes 50, the device 10 receives signals from the sensor 40. Depending on the configuration, the device 10 may activate/receive signals from the sensor 40 multiple times (or continuously). The data gathered from the sensor 40 is then analyzed and the results are provided to the user. It should be clear that, depending on the configuration, the device 10 may perform the analysis or the device 10 may be interfaced with another device or data processing system that performs the actual analysis.

To avoid the shortcomings of the prior art systems, the present invention uses a different analytical method for determining cannabinoid concentration in test samples. By using electrochemical methods combined with easy-to-use and disposable sample cartridges, the various embodiments of the present invention can accurately and quickly quantify at least the four main cannabinoid molecules associated with potency. The present invention can achieve quick and accurate test results by providing a streamlined test kit apparatus that requires minimal training to operate/use. Additionally, the configuration of one implementation of the present invention is such that the container can safely store the potentially dangerous chemicals used in testing away from the user. The container that stores the potentially dangerous chemicals can then be properly disposed of.

It should be clear that, when the cap 30 and sensor 40 are deployed on the container 20, the cap 30 seals the container. As well, when the cap 30 is deployed on the container 20, the sensor 40 protrudes into the interior of the container 20. In such an embodiment, with a suitable solution already in the container 20, a user simply has to deposit the sample into the container 20 and then seal the container 20 with the cap 30 (or, as noted above, with a second cap for mixing, resealing with the sensor-comprising cap 30 after mixing is complete). The sample and solution are then mixed through vigorous agitation by hand, vortexing, and/or any other method(s) of homogenization. Once done, the container is inserted into the port 45 of the device 10 (with the pointed end of the container pointing away from port 45). The container 20 is guided into position by receiver 451 of device 10, as shown in the exploded view of the device 10 in FIG. 2C. The receiver 451 interacts with features on cap 30 of container 20 and ensures that the electrodes 50 interface properly with the slot/connector 452 of device 10. By doing so, the electrodes 50 couple to the device 10, allowing the device 10 to send electrical signals to the sensor 40. This also allows the device 10 to read or receive electrical signals from the sensor 40. It should, however, be clear that the different components may be configured differently. As an example, the container and the sensor may be integrated into a single device.

As well, the port 45, and specifically the receiver 451, contains guiding features (i.e., one or more integral ridges, bumps, indentations, grooves, etc.) to ensure that the container is properly aligned as it is inserted, to provide a single smooth operation to the user. The orientation of the container is controlled via another feature (i.e., one or more integral ridges, bumps, indentations, grooves, etc.), such that the container can only be inserted in one orientation to thereby ensure proper electrical contact. The depth of insertion of the container is made recognizable to the user (e.g., by a cutaway in the receiver wall or by haptic and/or audible feedback such as a 'click'), such that the user can determine when the container is properly inserted.

As well, as seen in the exploded view of the device in FIG. 2C, the port 45 of the device has a specialized slot 452 in which the contacts of the sensor are inserted and which allows the sensor to be operated vertically. In one implementation, this slot/connector 452 is mounted to a PCB which allows electrical contact to the electronics module.

Figure 5:
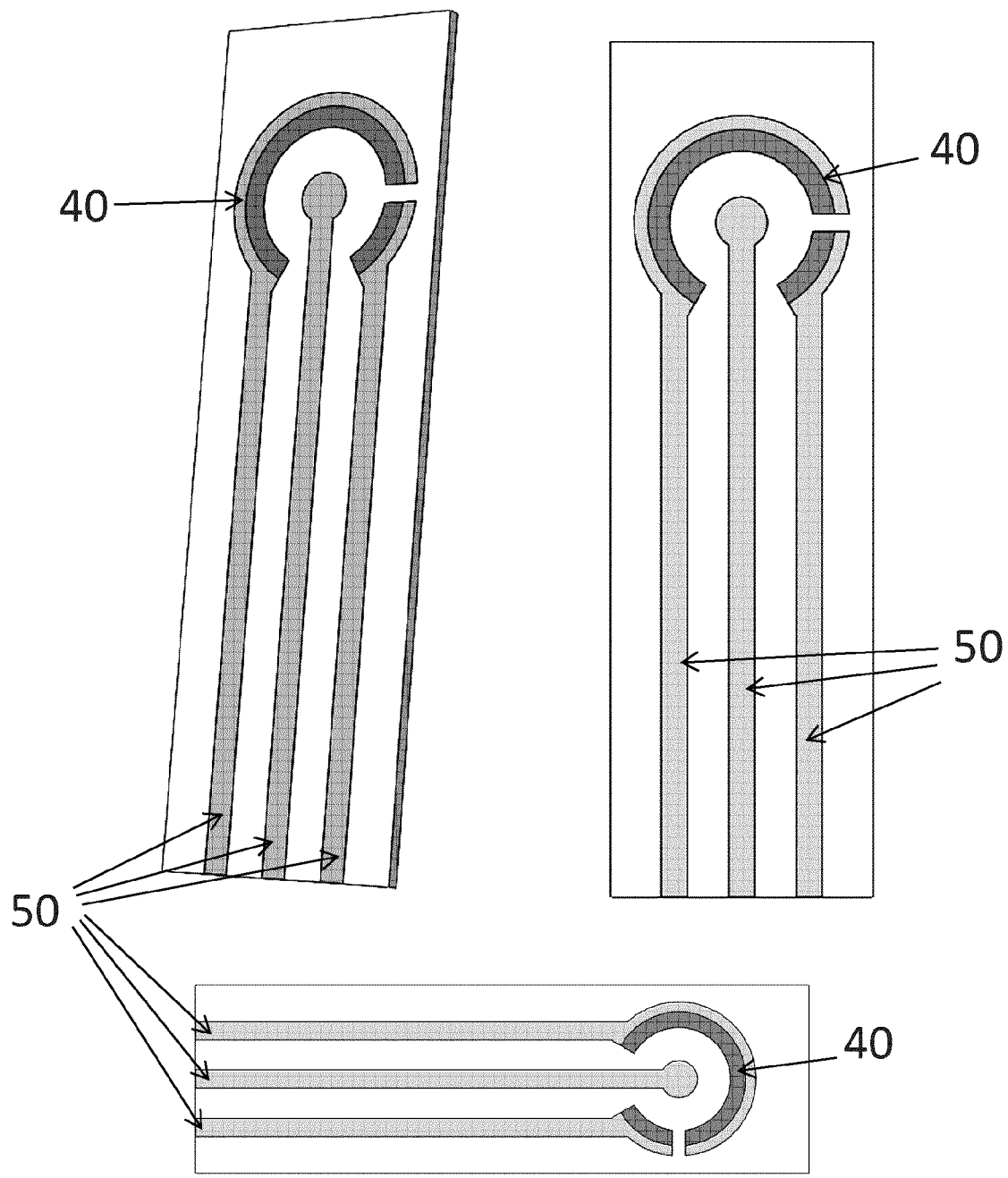
FIG. 5 illustrates an electrode/sensor assembly as used in the present invention.
Figure 6A:
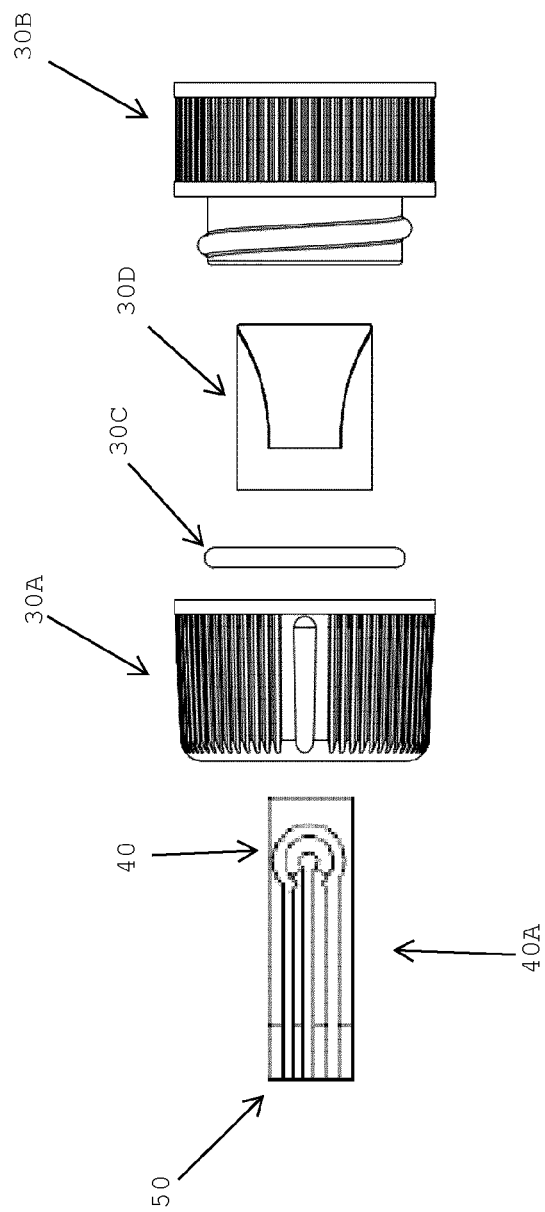
FIG. 6A shows a two-part cap in exploded view according to one embodiment of the present invention.

Referring to FIG. 5, one implementation of a sensor 40 and electrodes 50 is illustrated, in a perspective view (top left), a vertical view (top right), and a horizontal view (bottom centre). In this implementation, a three-contact surface printed electrode (SPE) 40A is used. As would be understood, the illustrations in FIG. 5 show a generic three-contact SPE, but many specific configurations of such an SPE are possible. The present invention is in no way limited to any specific SPE configuration or implementation. In the implementation shown in FIG. 5, however, the invention is operated by applying a voltage to the SPE through one of the three electrodes and the resulting current is measured through another of the three electrodes. As can be imagined, in some embodiments, the sensor 40 protrudes through the cap 30 and into the interior of the container 20 when the cap is attached to the container. The electrodes are thus on the outside of the container when the cap is deployed, as shown in FIG. 4. FIG. 6A shows an exploded view of the cap assembly, illustrating a two-part cap 30A, 30B, the three-contact surface printed electrode 40A, an O-ring 30C (to seal the area between the cap parts 30A and 30B), and a sensor holder 30D to ensure that the sensor is properly deployed in the cap assembly.

Figure 6B:
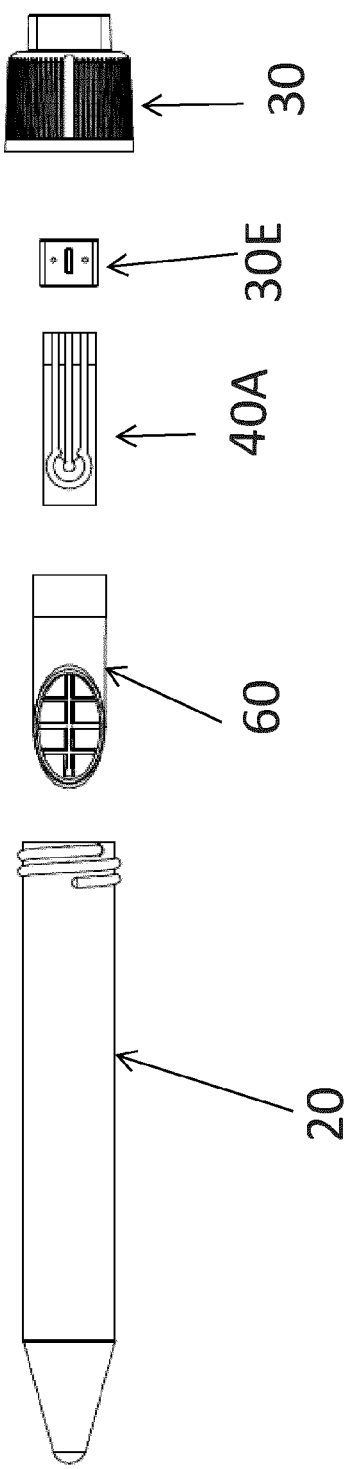
FIG. 6B shows a one-part cap in exploded view according to one embodiment of the present invention.
Figure 6C:
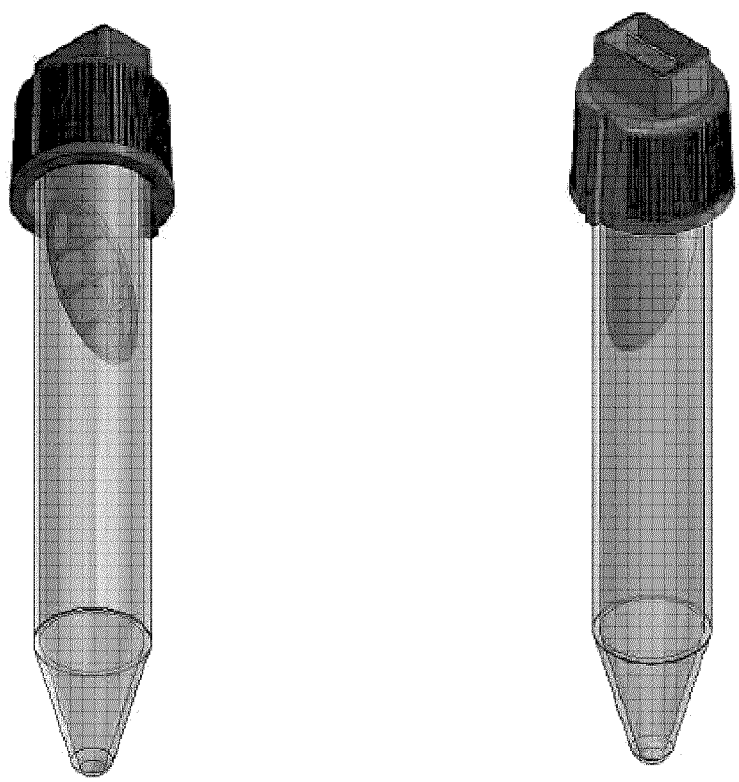
FIG. 6C shows an assembled one-part cap of the embodiment of FIG. 6B on a container, prior to use.

FIG. 6B shows another embodiment of the cap assembly, in an exploded view. The cap 30 in this Figure is a single-part cap. An overmould 30E within the cap 30 holds the three-contact surface-printed electrode 40A. A filter 60, in this embodiment, is fitted over the SPE 40. The filter comprises a non-metal mesh or membrane to prevent solid and/or particulate matter from directly contacting the sensor 40. FIG. 6C show this embodiment of the cap 30 when assembled with the container 20 and the filter 60. Of course, as would be understood, the filter 60 is not necessary in all embodiments or implementations. For example, in embodiments where the system and/or kit includes a filter 60, the filter 60 may be used for some tests of some samples (e.g., processed samples) and not used for tests of other samples (e.g., liquid samples with no solid/particulate matter).

It should be clear that the sensor may take many forms. In some implementations, the sensor may be an organic field effect transistor or any sensor suitable for use with cyclic voltammetry, linear voltammetry, square wave voltammetry, and/or similar methods may be used. It should, however, be clear that the present invention is not limited to the use of cyclic, linear, or square wave voltammetry. Any method that can induce a recordable Faradaic current and that is sensitive to a concentration of the analyte that is producing the Faradaic current may be used with the present invention. To clarify, any method which controls working electrode potential and is sensitive to concentration may be used. As such, any method that used voltammetric/potentiometric measurements that are sensitive to concentration may be used with the present invention. Sensors suitable for use with such methods may thus be used with the various embodiments or implementations of the present invention. Examples of such methods include: differential pulse voltammetry, staircase voltammetry, chronoamperometry, and stripping voltammetry.

Regarding the container 20, a preferred embodiment for the container 20 is that of a tubular transparent container made of a non-reactive substance (e.g., glass or a suitable plastic). Also preferable is that the closed end of the container may have a conical configuration, as shown in the Figures. Test tubes marketed as Falcon™ tubes may be used. Of course, other containers with other configurations may also be suitable.

Figure 7:
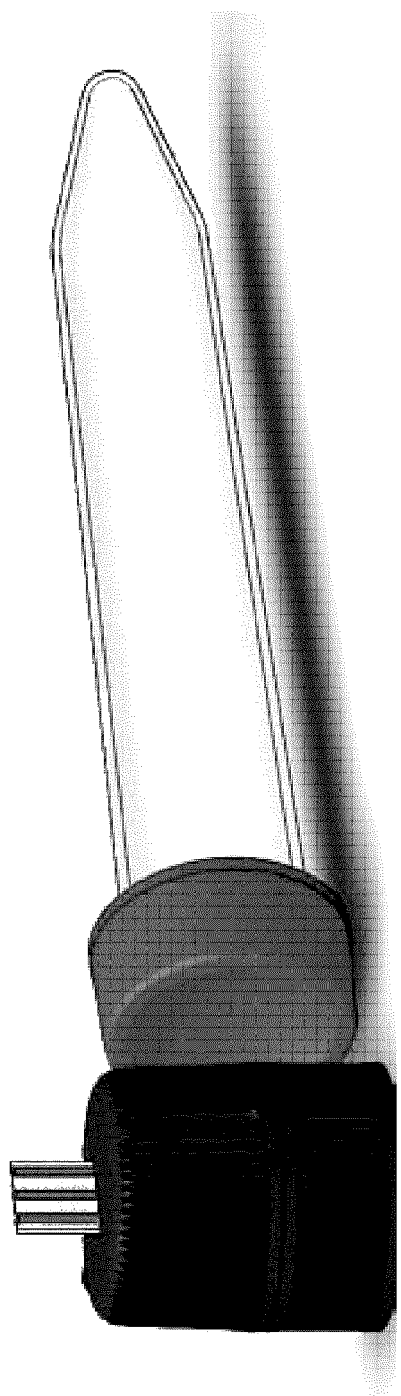
FIG. 7 shows an assembled two-part cap and a sealed container prior to use.

When provided to users, the system of the present invention includes the device 10 (see FIG. 2), a container 20, and a cap 30 with an integrated electrode/sensor assembly. Preferably, the container 20 is sealed and contains the solution necessary to analyze the sample. The sealed container 20 and the cap assembly with the electrode/sensor are illustrated in FIG. 7. As noted above, when in use, the sealed container is opened, and the sample is placed inside the container to mix with the solution. The cap is then used to seal the container and mixing of the solution and sample is ensured by agitation of the container. The mixed sample and solution is then caused to come into contact with the sensor and the electrodes are made to contact the suitable port in the device. The device can then operate to activate the sensor and to receive data from the sensor.

It should be clear that, in the examples above, the sample is a liquid sample. The liquid state of the sample eases the mixing between the sample and the liquid solution inside the container. However, as should be clear, samples of any state (i.e., initially solid, initially liquid, initially vapour) are testable by the present system. For some samples, suitable mixtures and/or solutions must be created before testing. That is, the sample tested may be a liquid, an oil, a solid suspended in a liquid, a solid, a vapour that has permeated into a liquid, and so on. In some implementations, the solid sample is processed. The processing (e.g., crushing, grinding, rendering the sample into a powder, etc.) prior to mixing with the solution ensures a larger surface area for chemical interactions between the solution and the solid sample. For implementations that are configured to allow solid/processed samples, the sensor is, in some embodiments, configured with a non-metal mesh, grating, screen, and/or filter to prevent solid particulates having near or direct contact with the sensor.

In one implementation, one of the electrodes in the three-contact electrode/sensor assembly is used to apply a range of voltages to the mixed sample/solution. For each voltage applied, a current in the mixed sample/solution is measured by way of one of the other electrodes. Depending on the configuration of the system analyzing the data, the range of voltages may be repeated so that multiple sets of data are obtained. The speed at which the voltages are applied may also be dependent on the configuration of the device.

As one example, voltages at 0.00244 Volt intervals are applied per 0.0244 seconds. This works out to a rate of 0.1 V/s or 0.00244 V/0.0244 sec. Multiple sweeps of the same voltage range may be conducted to result in multiple data sets. In one implementation, 2 sweeps from −0.5 V to 0.85 V, and 2 from 0.4 V to −1.4 V are conducted, to result in 4 data sets. Thus, starting at −0.5 V, the device applies voltages at 0.00244 V intervals with a pause at the end of the range (i.e., at 0.0244 sec) and a current reading is performed for each voltage application.

For clarity, in the example above, a pulse is applied at the start of the process, for example a pulse of −1.1 V. As would be clear, the amplitude of the pulse depends on the electrode configuration used and is not required to be −1.1 V or any other specific voltage. Further, none of the other voltages and/or durations given in these examples should be taken as limiting the invention in any way. In the example above, the pulse may last anywhere from 5 s to 120 s, depending on the implementation. The voltage starts at −0.5 V and sweeps upwards/positively until 0.85 V is reached. Then a second pulse is applied, which, depending on the implementation, may have the same amplitude or a different amplitude as the first pulse. For example, the second pulse might have an amplitude of 0.4 V, and again a duration of anywhere from 5 s to 120 s, followed by a sweep from 0.4 V downwards to −1.4 V. In some embodiments, these two pulses are repeated at least one further time, although additional repetitions are also possible.

It should of course be noted that the range may be dependent on the cannabinoid and/or sample to be tested. As an example, a range of from −1.4V to 1.4V, or 1.4 V to −1.4 V, has been used in some implementations. As should be understood, these are exemplary values only, and should not be considered to limit the electrochemical methods or values used with the present system. As well, it should also be noted that, using the present invention, multiple different substances within a single sample may be assessed. In some implementations, the multiple substances are assessed at different times, while in other implementations, multiple substances are assessed simultaneously. As would be clear to the person skilled in the art, the specific pulse pattern(s) needed to assess multiple substances and/or multiple substances simultaneously may be different from each other.

In one specific implementation, the device sweeps the voltage range of −0.5 V to 0.85 V twice, and sweeps the voltage range 0.4 V to −1.4 V twice, to result in 4 data sets. In some implementations, the sweeps are conducted in opposite directions (which may be termed 'forward' and 'reverse'). Thus, the first sweep may increase the voltage from −0.5 V to 0.85 V at 0.1V/s. The next sweep may then start at 0.4 V and then decrease the voltage at 0.1V/s to thereby sweep the range of 0.4 V to −1.4V. The next sweep may then repeat the first sweep. Other voltage ranges, voltage intervals, voltage application intervals, and other voltage application parameters may also be used.

It should be clear that the voltage ranges, the sweep times, and other parameters may be adjusted as necessary and as desired. In the case of square wave voltammetry, other parameters that may by adjusted as necessary include pulse magnitude, pulse duration, number of pulses, frequency, amplitude, deposition voltage, and time of equilibration. In general, time is calculated while the rate and step/interval size are chosen. In one example, the step size was 0.00244 V while the amount of time for which the voltage is held is equal to the rate (0.1 V/s) divided by the step size (0.00244 V). This results in holding each voltage along pattern for 0.0244 seconds.

Note as well that the number of sweeps used may depend on the cannabinoid of interest. For example, when the cannabinoid is THC or THCa, 2 sweeps (i.e., a full set of forward and reverse sweeps) may be sufficient but using at least 4 sweeps (i.e., two full sets of sweeps) produces a better result.

For the voltage range, it has been found that a range of −1.5 V to 1.5 V is recommended for the set up as described above as, outside of this range, the resulting signal provides unsuitable results.

It should be noted that, for this exemplary embodiment, the concentration of electrolyte in the sample should be held constant at 30.77 mg/ml. The concentration of electrolyte may be adjusted in future iterations based on the electrolyte identity, the solvent, the analyte to be investigated, and/or any other substances added into the solution. Also, the solution may, in some implementations, contain a substance used for internal calibration of the device. The expected current response of the calibrant substance is determined externally by laboratory grade equipment. The current and/or potential response of the calibrant substance within the solution is compared to the expected response of the calibrant substance. If there are differences between the current response of calibrant substance within the solution and the expected current response of the calibrant substance, then subsequent data processing procedures may be performed to adjust for the obtained difference. The calibrant substance used in the solution is ferrocene and should be held constant at a concentration of 0.0372 mg/ml. It should be clear that the type of calibrant substance and concentration of calibrant substance in the solution my change in future iterations.

It should be clear that each sweep across the voltage range results in a set of current readings, each current reading corresponding to an applied voltage in the voltage range. Peaks in the current readings for each data set are found in the data analysis and the corresponding value of each peak and/or the voltage applied corresponding to each peak are noted in the analysis. Depending on the specific combination of the sample and the solution, the number of peaks, the peak values, the peak areas, and the voltage values corresponding to the peaks in the data set are correlated with experimentally derived data to determine a concentration of the substance in the sample. Where necessary, a regression process may be applied to the resulting data in the event the data points found do not exactly correspond with the experimentally derived data. It should also be clear that other processes and methods, such as those involving machine learning, neural networks, and artificial intelligence, may be used in the analysis of the readings from the device of the present invention.

In some implementations, the data results obtained from the voltage sweeps may need to be correlated to the experimentally obtained data for the specific sample and solution combination. To ensure that this occurs, the user, prior to mixing the sample with the solution, enters/sets the sample/solution combination in the device. This means that the user selects the substance whose concentration is to be determined from the sample as well as the identity/components of the solution in the container. The identity/components of the solution are, of course, known/provided to the user prior to the use of the system. As an example, a label on the sealed and unused container may indicate the contents/composition of the solution within. Alternatively, other methods of indicating the contents/composition of the solution within may be used (e.g., an RFID chip on the container that can be read by the device). Once the user has entered the correct parameters for the substance to be tested for, as well as the solution being used in the test, the user can proceed with testing the sample as noted above.

Regarding the solution used in the analysis and the substances being detected/analyzed for, different implementations may use different solutions and/or substances. In one implementation, the substances being tested for are all cannabinoid derived/cannabinoid related. For this implementation, the substances that could be tested for include cannabidiol (CBD), cannabidiolic acid (CBDa), tetrahydrocannabinol (THC), and tetrahydrocannabinolic acid (THCa). The solutions for which experimental data exists for the above substances include TBAP-DMSO, TBAP-DMSO-Fc, TBAP-DMSO-CoPc, TBAP-DMSO-FBBB, and TBAP-DMSO-CoPc-FBBB. As known to those in the art, TBAP refers to tetrabutylammonium perchlorate, DMSO refers to dimethyl sulfoxide, CoPc refers to cobalt(II) phthalocyanine, Fc refers to ferrocene, and FBBB refers to Fast Blue BB. Of course, other suitable solutions and/or substances may be used, as may be apparent to the person skilled in the art.

In particular, the kit and system of the present invention can also be used for estimating the concentration of other non-cannabinoid substances. For example, the kit and system of the present invention can be used for estimating concentrations of psychoactive substances in psychedelics; intoxicants, sugars, acids, and other compounds in alcoholic products; and substances such as sugar and caffeine in other agricultural products. Of course, as would be understood by the person skilled in the art, each specific sample and substance may require specific solutions and electrochemical methods Once the data sets have been obtained using the device, these data sets are analyzed, either using the device or a separate data processing device to which the device is interfaced with.

Once the peaks have been found and correlated with the experimental data, and once the data has been processed, estimates for the concentrations of the substances can be calculated and provided to the user. It should be clear that the results may be provided to the user using a user interface on the device itself or the results may be provided to the user by way of the data processing device to which the device 10 is interfaced.

Once the results have been obtained, the container is kept sealed using the cap and can be disposed of properly. Once the sample and the solution have been mixed and the data results obtained, the container need not be unsealed, and the mixed sample and solution can be disposed of in a safe and environmentally friendly manner. Once the container has been sealed with the sample inside, the user need not have any contact with the sample. It should be clear that, in such an embodiment, the user need not have any contact with the solution inside the container. Other embodiments, discussed further below, may involve user-directed transfers of the sample between containers.

Figure 8:
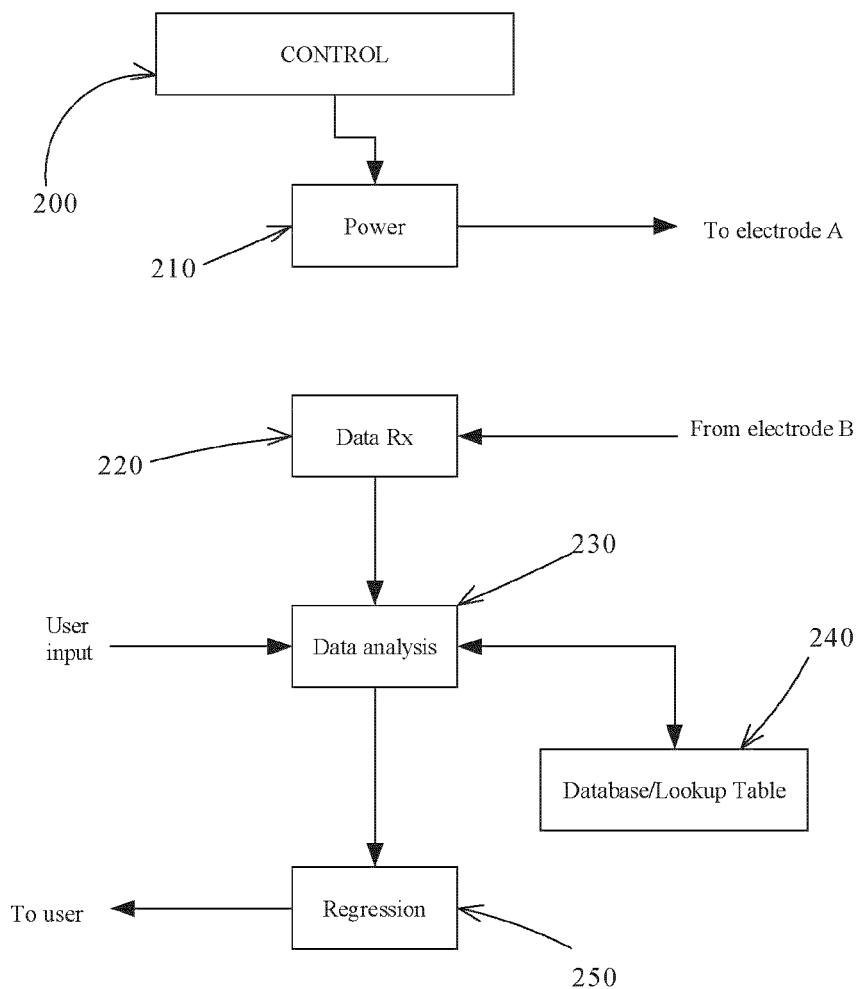
FIG. 8 is a schematic view of various modules used by one aspect of the present invention.

Referring to FIG. 8, a block diagram illustrating the system and its working is illustrated. As can be seen, a control module 200 is present in the system. The control module 200 controls the output of the power module 210. The power module output is sent to one of the electrodes (electrode A) of the electrode/sensor assembly and this output is the voltage applied to the sensor. The control module thus controls the level of the voltage applied, the frequency of the application of the voltage, and the duration of the voltage pulse. Once the voltage pulse has been applied, a current is generated and this current is then read by way of one the electrodes (electrode B) of the electrode/sensor assembly. This current signal is then received by way of a data receive module 220. Data equalization, amplification, IV conversion, and A/D conversion, as well as other processing of the analog current signal may be performed in the data receive module 220. Once the data received has been properly processed, the data is sent to the data analysis module 230 for analysis. The data is analyzed to detect peaks in the data, as well as to determine the correlation between the data about the peaks and the experimentally derived data. It should also be clear that the data analysis procedure may include a step to calibrate the obtained signal using a current response from the calibrant substance. The correlation can be performed with reference to a database or a lookup table in module 240. The data analysis module 230 thus retrieves whatever data is necessary (e.g., data necessary for inverse regression) from the storage module 240. To clarify, once the measurement has been completed, the current reading at the apex or peak of the data from the measurement is passed through a function that performs the regression using the values from the database. This then converts the current value into a concentration estimate that can then be sent to the user. It must be noted that, of the modules in FIG. 8, the control module 200, the power module 210, and the data receive module 220 form part of the device. The data analysis module 230, the storage module 240, and the regression module 250 may form part of another device that is dedicated to data processing (e.g., a computer, a smartphone, a tablet) and to which the device is tethered or interfaced to. However, it must also be clear that, for some embodiments, the modules 230, 240, 250 may also form part of the device such that the device according to one aspect of the present invention is a complete self-contained analysis device.

It should be clear that variations on the present invention are possible. Some variations involve information besides, or in addition to, apex values from the received current signal. Depending on the embodiment, such information comprises other data points or information derived from the received current signal and/or comprises information related to the sample itself. Some variations may involve providing different database modules for different chemistries with the device scanning for different parameters. The different database modules would have parameters and data useful for calculating or estimating concentrations using the different chemistries. Of course, for such variations, the containers and solutions may use different substances from those detailed above.

Figure 9:
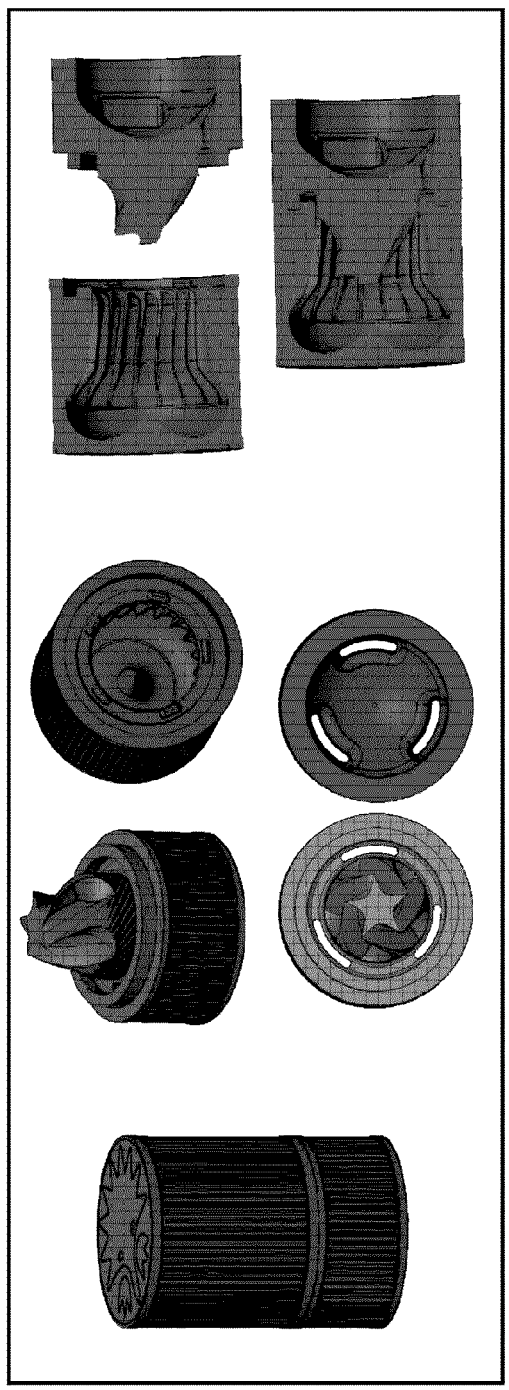
FIG. 9 illustrates various views of a variant of the cap that incorporates a grinder.

In some embodiments, a grinder is integrated in the cap 30 to allow the user to grind solid samples. Different possible designs of such a cap integrated grinder are shown in FIG. 9. As can be seen in the right section of FIG. 9, a cutaway image of a possible two-part grinder cap is shown. This two-part grinder cap has a first part having a cavity and the second part having a protrusion that nests inside the cavity. The solid sample can be placed in the cavity and the second part can be used to grind the sample. The ground sample can then be deposited inside the container in the same manner as a liquid sample. The left side of FIG. 9 illustrates an assembled cap that incorporates the grinder while the middle portion of FIG. 9 shows various views of the grinder portion of the cap.

Figure 10:
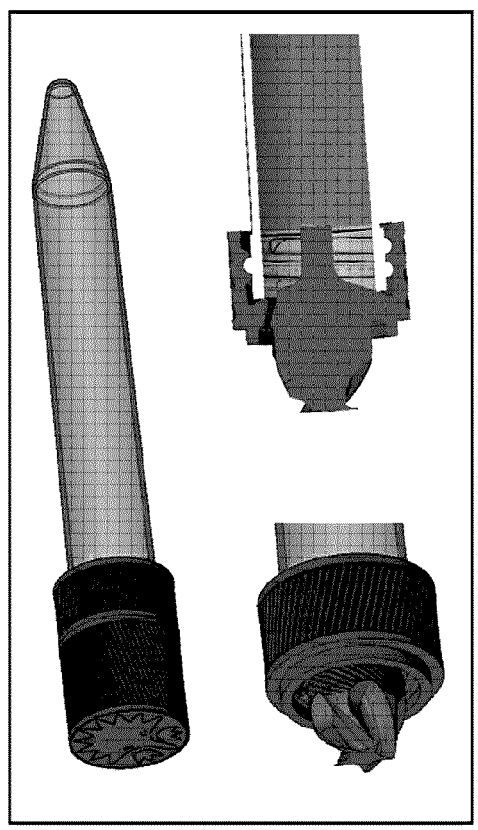
FIG. 10 shows the variant in FIG. 9 deployed on a container.

For clarity, FIG. 10 shows the grinder cap deployed on the container. As can be seen from the top of FIG. 10, when the cap is assembled, a protruding burr is not visible.

It should also be clear that while a grinder or other processing element may form part of the cap portion of the system, the processing element(s) may also be integrated into the device. Similarly, the processing element(s) may be entirely separate from the cap and from the device. In some embodiments, the processing element(s) are contained within the container. In another embodiment, as discussed further below, the processing elements are contained within a second container. As well, a scale may also be part of the device to ensure that the user has a sufficient amount of the sample to ensure suitable results. Such processing may include any process which increases the solid sample's surface area, including without limitation: grinding, pulverizing, slicing, crushing, milling, etc. The processing of the solid sample, in some embodiments, occurs prior to mixing the resulting processed sample with the solution in the container, while, in some embodiments, the processing occurs simultaneously with mixing.

Figure 11:
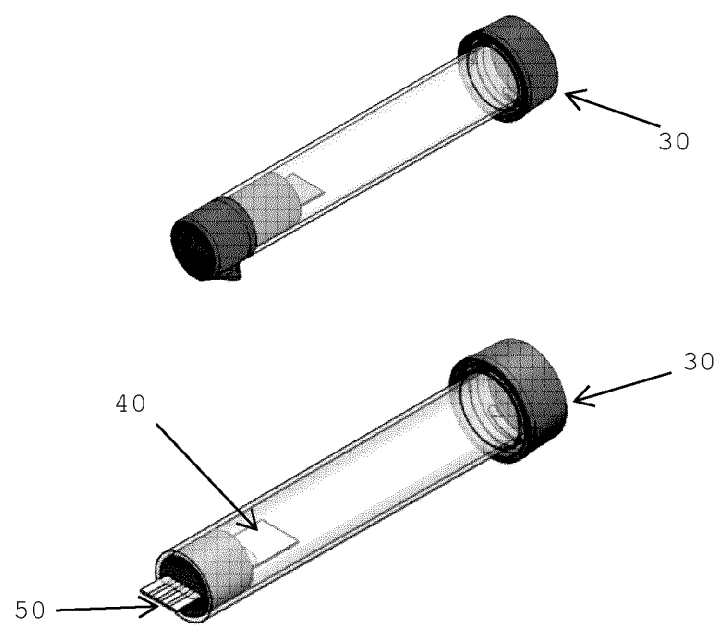
FIG. 11 illustrates a variant of the container that integrates the electrode/sensor assembly with the container.

As another variant of the present invention, FIG. 11 shows a variant of the container. From the figure, it can be seen that this variant has an integrated electrode/sensor assembly integrated into the container and not into the cap as in FIGS. 3 and 4. For this variant, the cap still seals the container, and a secondary cap covers the electrodes that are integrated at the bottom of the container.

In some embodiments, the system further comprises a second container. The second container is used before the container described above and allows for additional pre-processing of a solid (e.g., plant) material sample. That is, in some embodiments, one or more processing elements is contained in the second container. The solid sample is added to the second container and agitated, to thereby produce a processed sample. The processing element in one such embodiment comprises beads (e.g., metal or hard plastic spheres) that, upon shaking or vortexing the container, crush the plant material into fine particulates. An extraction fluid is also present in the second container before the second container is agitated or added to the second container after the second container has been agitated. A fluid transfer device, such as, e.g., a syringe, is used by the user to transfer a small amount of fluid from the primary to the secondary container. Such a fluid transfer step enables a dilution of the sample fluid, which allows the system to handle larger initial sample sizes.

Figure 12:
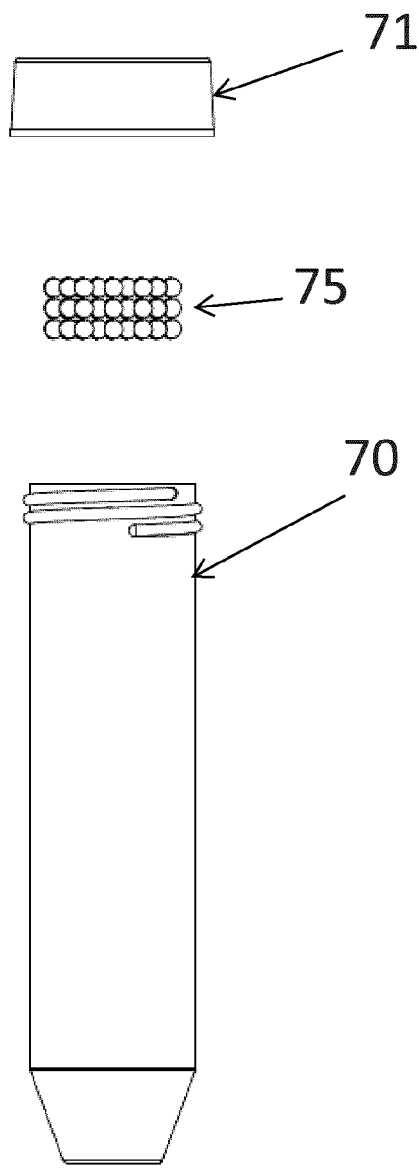
FIG. 12 illustrates a second container for grinding a solid sample.

FIG. 12 illustrates such a second container 70 with a cap 71. As should be clear, the cap 71 is merely a secure cap and contains no electronics, electrodes, etc. A processing element 75, as illustrated a plurality of beads, is introduced to the second container 70. A solid sample and/or an extraction fluid can be added to the second container 70 as described above. As well, in some embodiments, a filter is provided in the second container 70 such that particulate matter of the processed sample is strained from the sample fluid that is extracted using the fluid transfer device.

From the above, it should be clear that at least one embodiment of the present invention uses cyclic voltammetry (CV) to determine the estimated concentrations of the substance. CV is suitable for such uses as cyclic voltammetry (CV) models require less than ten minutes to run in contrast to HPLC which can take hours to analyze in-house. For some of the embodiments, CV makes use of the three-contact surface printed electrode (SPE) detailed above and, as should be clear, operates by applying a voltage to an electrode and measuring the resulting current. A solvent, such as those listed above, may be used to solubilize the sample being analyzed.

In another embodiment, square wave voltammetry (SWV) is used to determine the estimated concentrations of the substance. SWV, like CV, is suitable for such uses as it requires less than ten minutes to set up and run, in contrast to HPLC which can take hours to analyze in-house. For some of the embodiments, SWV makes use of the three-contact surface printed electrode (SPE) detailed above and, as should be clear, operates by applying a voltage to an electrode and measuring the resulting current. A solvent, such as those listed above, may be used to solubilize the sample being analyzed.

The present invention provides a number of advantages over currently used methods. As noted above, present solutions commonly use optical/or chromatography methods in determining cannabinoid content. The present invention may use various electrochemical methods, including without limitation cyclic and square wave voltammetry, that provide more accurate results in less time than conventional methods. As well, current methods typically utilize parts that require cleaning and manual operation. The present invention uses a single-use cartridge style container integrated in a test kit that does not require the extensive maintenance or technical knowledge. In addition, the present invention allows for tests to be done in non-laboratory settings. The various embodiments of the present invention thus provide rapid and accurate results while minimizing contamination and footprint.

As used in this document, the phrase "at least one of [x] and [y]" means and should be construed as meaning "[x], [y], or both [x] and [y]". As well, singulars in this document include the plurals, and vice versa, except as expressly stated to the contrary.

It should be clear that, in addition to the hardware of the present invention, some of the various elements of the present invention, i.e., the data collection and analysis elements, may be implemented as software modules in an overall software system. As such, the present invention may comprise computer executable instructions that, when executed, implements various software modules with pre-defined functions.

Embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM), flash memory, or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for gathering data for estimating a concentration of at least one substance in a sample, the system comprising:
    a first container containing a processing element, wherein said first container is configured to process a solid sample of said at least one substance to thereby produce a processed sample of said at least one substance, and wherein said processed sample has a larger surface area than said solid sample;
    a second container for said processed sample and for a solution, wherein said processed sample and said solution have different electrical properties when mixed with one another;
    a contact-based sensor for sensing said electrical properties of a mixture of said processed sample and said solution, said sensor being within said second container and in contact with said mixture;
    a plurality of electrodes coupled to said sensor for applying a voltage to said sensor and for receiving a current signal through said sensor; and
    an electronics module for controlling said voltage and for measuring characteristics of said current signal,
    wherein
    said electronics module interfaces with a data processing device to thereby allow said data processing device to analyze said characteristics of said signal and to thereby estimate said concentration of said at least one substance based on said characteristics of said signal, and
    said electronics module is coupled to said plurality of electrodes to allow for control of said voltage and to allow for reception and measurement of said signal.

2. The system according to claim 1, wherein said at least one substance is a cannabis-derived substance.

3. The system according to claim 1, wherein said at least one substance is at least one of: CBD, CBDa, THC, THCa, CBG, CBGa, CBN, CBNa, CBC, CBCa, THCV, CBDV, another cannabinoid, and a non-cannabinoid substance.

4. The system according to claim 1, wherein said solution comprises a solvent and an electrolyte.

5. The system according to claim 4, wherein said solution comprises at least one of: TBAP, DMSO, CoPc, Fc, and FBBB.

6. The system according to claim 1, wherein electrochemical methods are used to estimate said concentration.

7. The system according to claim 1, wherein said voltage signal is repeatedly applied at different voltages to result in different current signals sensed through said sensor.

8. The system according to claim 1, wherein a range of voltages is applied and, for each voltage applied a current is sensed through said sensor.

9. The system according to claim 1, wherein said solution is provided inside said second container.

10. The system according to claim 1, further comprising a cap to seal said second container once said solution and said processed sample are in said a mixture.

11. The system according to claim 10, wherein said sensor and said electrodes are incorporated into said cap.

12. The system according to claim 11, wherein, when said cap is deployed on said second container, said sensor protrudes into an interior of said second container such that when said processed sample and said solution are mixed in said second container, said mixture is in contact with said sensor.

13. The system according to claim 1, wherein said first container further comprises an extraction fluid, such that said processed sample and said extraction fluid form a second mixture, said system further comprising a fluid transfer device for transferring a portion of said second mixture to said second container after said processing.

14. A kit for determining a concentration of at least one substance, the kit comprising:
- a first container containing a processing element, wherein said first container is configured to process a solid sample of said at least one substance to thereby produce a processed sample of said at least one substance, and wherein said processed sample has a larger surface area than said solid sample;
- a second container for said processed sample and for a solution, wherein said processed sample and said solution have different electrical properties when mixed with one another;
- a contact-based sensor for sensing said electrical properties of a mixture of said processed sample and said solution, said sensor being within said second container and in contact with said mixture;
- a plurality of electrodes coupled to said sensor for applying a voltage to said sensor and for receiving a current signal through said sensor; and
- an electronics module for controlling said voltage and for measuring characteristics of said current signal, wherein
said electronics module interfaces with a data processing device to thereby allow said data processing device to analyze said characteristics of said signal and to thereby estimate said concentration of said at least one substance based on said characteristics of said signal, and
said electronics module is coupled to said plurality of electrodes to allow for control of said voltage and to allow for reception and measurement of said signal.

15. The kit according to claim 14, wherein said solution is part of said kit.

16. The kit according to claim 14, wherein said at least one substance is a cannabis-derived substance.

* * * * *